United States Patent
Bennett

(10) Patent No.: US 9,944,052 B2
(45) Date of Patent: *Apr. 17, 2018

(54) ENCAPSULANTS FOR WINDOW ASSEMBLIES

(71) Applicant: AGC AUTOMOTIVE AMERICAS R&D, INC., Ypsilanti, MI (US)

(72) Inventor: Daniel Bennett, Tecumseh, MI (US)

(73) Assignee: AGC AUTOMOTIVE AMERICAS R&D, INC., Ypsilanti, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/433,697

(22) PCT Filed: Oct. 10, 2013

(86) PCT No.: PCT/US2013/064365
§ 371 (c)(1),
(2) Date: Apr. 6, 2015

(87) PCT Pub. No.: WO2014/059162
PCT Pub. Date: Apr. 17, 2014

(65) Prior Publication Data
US 2015/0239214 A1    Aug. 27, 2015

Related U.S. Application Data

(63) Continuation of application No. 13/650,843, filed on Oct. 12, 2012, now Pat. No. 8,790,771.

(51) Int. Cl.
*B60J 10/02* (2006.01)
*B32B 17/06* (2006.01)
(Continued)

(52) U.S. Cl.
CPC ............ *B32B 17/064* (2013.01); *B32B 37/02* (2013.01); *B60J 10/70* (2016.02); *B32B 2255/26* (2013.01);
(Continued)

(58) Field of Classification Search
CPC ...... B60J 10/02; B60J 10/0005; C09J 151/06; C08L 51/06; Y10T 428/24983; Y10T 428/24793
(Continued)

(56) References Cited

U.S. PATENT DOCUMENTS

| 4,571,278 A | 2/1986 | Kunert |
| 5,635,281 A | 6/1997 | Agrawal |

(Continued)

FOREIGN PATENT DOCUMENTS

| CA | 2 234 270 C | 5/1997 |
| CN | 1914288 A | 2/2007 |

(Continued)

OTHER PUBLICATIONS

International Search Report for Application No. PCT/US2013/064365 dated Jan. 23, 2014, 4 pages.

(Continued)

*Primary Examiner* — Alexander Thomas
(74) *Attorney, Agent, or Firm* — Howard & Howard Attorneys PLLC

(57) ABSTRACT

A window assembly for a vehicle having an essentially chlorine-free modified polyolefin primer (24) disposed onto a transparent pane (12) and a two-shot encapsulant applied onto the primer is provided. The two-shot encapsulant includes a first encapsulation layer (22A) disposed on the primer (24) and a second encapsulation layer (22B) disposed on the first encapsulation layer (22A). The first encapsulation layer (22A) has a Shore D hardness of at least 39 and a Flexural modulus of at least 100 MPa, while the second encapsulation layer (22B) has a Shore A hardness of less than 90.

22 Claims, 1 Drawing Sheet

(51) Int. Cl.
*B32B 37/02* (2006.01)
*B60J 10/70* (2016.01)

(52) U.S. Cl.
CPC ... *B32B 2307/412* (2013.01); *B32B 2307/536* (2013.01); *B32B 2398/10* (2013.01); *B32B 2605/003* (2013.01); *Y10T 428/23* (2015.01); *Y10T 428/24777* (2015.01); *Y10T 428/24793* (2015.01); *Y10T 428/24983* (2015.01)

(58) Field of Classification Search
USPC ......................................................... 428/194
See application file for complete search history.

(56) References Cited

U.S. PATENT DOCUMENTS

| | | | |
|---|---|---|---|
| 6,134,851 A * | 10/2000 | Roze | B60J 10/70 296/84.1 |
| 6,546,683 B1 | 4/2003 | Senge | |
| 2001/0051260 A1 | 12/2001 | Johnson et al. | |
| 2002/0060445 A1 | 5/2002 | Shirk et al. | |
| 2003/0005563 A1 | 1/2003 | Tamai et al. | |
| 2005/0091935 A1 | 5/2005 | Amano et al. | |
| 2007/0031644 A1 | 2/2007 | Kasahara et al. | |
| 2008/0319133 A1 | 12/2008 | MacLachlan | |
| 2009/0123640 A1 | 5/2009 | Suzuki | |
| 2009/0293368 A1 | 12/2009 | Repp et al. | |
| 2010/0001550 A1 * | 1/2010 | Janisch | B60J 10/18 296/146.2 |
| 2011/0143113 A1 | 6/2011 | Hatta et al. | |
| 2012/0256447 A1 | 10/2012 | Majer | |

FOREIGN PATENT DOCUMENTS

| | | |
|---|---|---|
| DE | 195 39 960 A1 | 4/1997 |
| EP | 0 857 116 B1 | 1/2002 |
| EP | 1 712 604 A1 | 10/2006 |
| EP | 1 818 381 A1 | 8/2007 |
| GB | 2 411 924 A | 9/2005 |
| GB | 2 422 398 A | 7/2006 |
| JP | S 50-020418 A | 3/1975 |
| JP | S 56-088481 A | 7/1981 |
| JP | S 59-187986 A | 10/1984 |
| JP | H 06-129164 A | 5/1994 |
| JP | H 10-002169 A | 1/1998 |
| JP | H 11-294035 A | 10/1999 |
| JP | 2001-123762 A | 5/2001 |
| JP | 2005-088773 A | 4/2005 |
| WO | WO 99/55547 A1 | 11/1999 |
| WO | WO 2012/015936 A1 | 2/2012 |
| WO | WO 2012/159072 A2 | 11/2012 |

OTHER PUBLICATIONS

English language abstract for CN 1914288 extracted from espacenet.com database on Apr. 29, 2015, 2 pages.
English language abstract for DE 195 39 960 extracted from espacenet.com database on Apr. 29, 2015, 2 pages.
English language abstract for EP 0 857 116 extracted from espacenet.com database on Apr. 29, 2015, 2 pages.
English language abstract and machine-assisted English translation for EP 1 818 381 extracted from espacenet.com database on Apr. 29, 2015, 10 pages.
English language abstract for WO 99/55547 extracted from espacenet.com database on Apr. 29, 2015, 1 page.
Machine-assisted English translation for JPS 50-020418 extracted from the PAJ database on Aug. 2, 2017, 4 pages.
English language abstract and machine-assisted English translation for JPS 56-088481 extracted from espacenet.com database on Aug. 2, 2017, 11 pages.
English language abstract not found for JPS 59-187986; however, see English language equivalent U.S. Pat. No. 4,571,278. Original document extracted from espacenet.com database on Aug. 2, 2017, 7 pages.
English language abstract and machine-assisted English translation for JPH 06-129164 extracted from espacenet.com database on Aug. 2, 2017, 17 pages.
English language abstract and machine-assisted English translation for JPH 10-002169 extracted from espacenet.com database on Aug. 2, 2017, 27 pages.
English language abstract and machine-assisted English translation for JPH 11-294035 extracted from espacenet.com database on Aug. 2, 2017, 18 pages.
English language abstract and machine-assisted English translation for JP 2001-123762 extracted from espacenet.com database on Aug. 2, 2017, 14 pages.
English language abstract for JP 2005-088773 extracted from espacenet.com database on Aug. 2, 2017, 2 pages.

* cited by examiner

ENCAPSULANTS FOR WINDOW ASSEMBLIES

RELATED APPLICATIONS

This application is the National Stage of International Patent Application No. PCT/US2013/064365, filed on Oct. 10, 2013, which claims priority to and all the advantages of U.S. patent application Ser. No. 13/650,843, filed on Oct. 12, 2012, now issued U. S. Pat. No. 8,790,771, issued on Jul. 29, 2014, the content of which is incorporated herein by reference.

BACKGROUND OF THE INVENTION

1. Field of the Invention

The present invention generally relates to encapsulants for use in window assemblies.

2. Description of the Related Art

Polymeric encapsulants for window assemblies, such as those used on vehicles, are generally known in the art. Generally, window assemblies include a transparent pane, commonly made from glass. A ceramic frit is typically disposed about a perimeter of the transparent pane by methods commonly known in the art, like printing the ceramic frit on the transparent pane. The polymeric encapsulant is bonded to the perimeter of the transparent pane. The encapsulant can be bonded to one, two, or three surfaces of the transparent pane, and is typically bonded to the transparent pane via a primer. Said differently, the encapsulant bonds to the primer, which is bonded to the transparent pane, thereby bonding the encapsulant to the transparent pane.

Generally, the encapsulants can be either a thermosetting material or a thermoplastic material. Exemplary thermosetting materials include, for example, a reaction injection molded (RIM) material, while exemplary thermoplastic material include materials such as polyvinylchloride (PVC) or thermoplastic elastomers (TPEs).

In certain applications, the polymeric encapsulant is applied in two separate applications steps with two separate polymeric materials, and therein forms a two-shot encapsulant having a first encapsulation layer and a second encapsulation layer such that the first encapsulation layer is between the transparent pane and the second encapsulation layer. While such window assemblies including two-shot encapsulants are generally suitable for their intended purpose, these window assemblies do suffer from a variety of known deficiencies, including water leakage between the transparent pane, with or without the primer, and the first encapsulation layer.

SUMMARY OF THE INVENTION AND ADVANTAGES

A window assembly includes a transparent pane having a first surface, a second surface, and an edge defined between the first surface and the second surface. The window assembly also includes a modified polyolefin primer disposed on the edge and on at least one of the first surface and the second surface of the transparent pane, a first encapsulation layer having a Shore D hardness of at least 39 and a Flexural modulus of at least 100 MPa disposed on the primer, and a second encapsulation layer disposed on the first encapsulation layer and having a Shore A hardness of less than 90. Stated differently, the second encapsulation layer has a hardness that is less than the hardness of the first encapsulation layer as measured by the Shore hardness scales in accordance with ASTM D2240.

The modified polyolefin primer is formed by graft-copolymerizing at least one member selected from a group consisting of an $\alpha,\beta$-unsaturated carboxylic acid and an acid anhydride thereof, to a propylene-$\alpha$-olefin copolymer.

The window assemblies formed in accordance with the present invention and including the modified polyolefin primer and the first and second encapsulation layers as described above provides for substantially decreased water leakage between the primed transparent pane and the first encapsulation layer as compared with window assemblies not utilizing a primer, or in window assemblies utilizing other types of primers, including chlorine-containing modified polyolefin primers.

BRIEF DESCRIPTION OF THE DRAWINGS

Other advantages of the present invention will be readily appreciated, as the same becomes better understood by reference to the following detailed description, when considered in connection with the accompanying drawings.

DETAILED DESCRIPTION OF THE INVENTION

Referring to the Figures, wherein like numerals indicate like or corresponding parts throughout the several views, a window assembly is generally shown at 10. The window assembly 10 is suitable for use in a vehicle, for example vent windows and quarter windows, as well as vertical and horizontal sliding windows. Additionally, it is to be appreciated that the window assembly 10 may also be implemented in non-vehicle applications.

Figure 1:
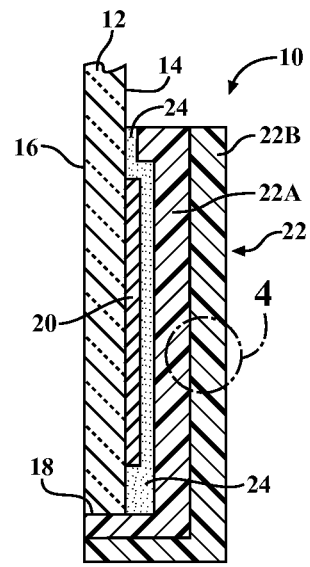
FIG. 1 is a cross-sectional view of the transparent pane of the window assembly showing the primer bonding a two-sided encapsulant to the transparent pane.
Figure 2:
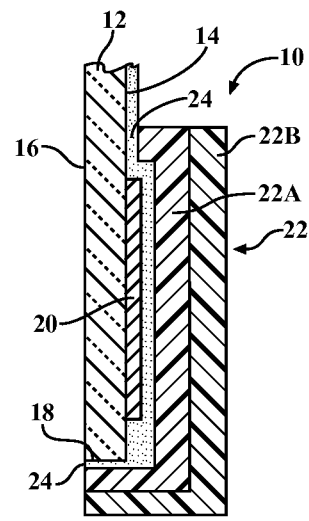
FIG. 2 is a cross-sectional view of the transparent pane of the window assembly showing the primer bonding a two-sided encapsulant to the transparent pane wherein two-shot encapsulant does not cover the entirety of the underlying primer.
Figure 3:
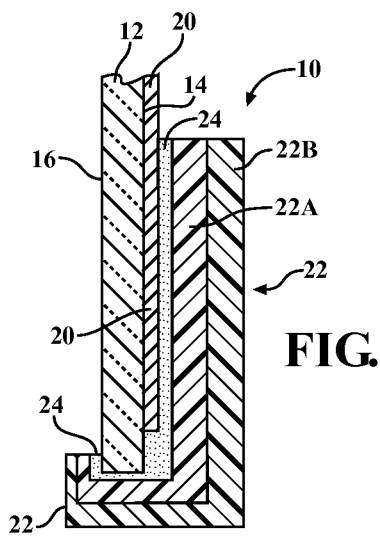
FIG. 3 is a cross-sectional view of the transparent pane of the window assembly showing the primer bonding a three-sided encapsulant to the transparent pane.

With reference to FIGS. 1-3, the window assembly 10 includes a transparent pane 12, also commonly referred to as a glazing, having a first surface 14 and a second surface 16 spaced from and opposite to the first surface 14. It is to be appreciated that the transparent pane 12, as described herein, may be partially or completely transparent and may even be tinted to various levels such that the transparent pane 12 may be opaque. The transparent pane 12 is not required to be completely transparent. The transparent pane 12 further includes an edge 18, with the edge 18 defining a perimeter of the transparent pane 12. The edge 18 is between and connects the first surface 14 and the second surface 16.

The transparent pane 12 is typically glass, more typically soda-lime glass. However, it is to be appreciated that the transparent pane 12 may be other types of glass, including non-tempered glass or tempered glass, non-laminated glass or laminated glass, or any polymeric material known in the art.

In certain embodiments, as also shown in FIGS. 1-3, a ceramic frit 20 may be disposed on the transparent pane 12.

Typically, the ceramic frit 20 is disposed on the first surface 14 of the transparent pane 12. The ceramic frit 20 is bonded to the transparent pane 12 by known methods, such as printing and in such methods the transparent pane 12 may be referred to as a printed assembly. The ceramic frit 20 may present a uniform border around the perimeter of the transparent pane 12, thereby enhancing an aesthetic appearance of the window assembly 10. The ceramic frit 12 may also protect the urethane bead utilized to couple the window assembly 10 to the vehicle. It is to be appreciated that the ceramic frit 20 may be omitted from the transparent pane 12. If the ceramic frit 20 is omitted, the transparent pane 12 is known in the art as a non-printed assembly. The ceramic frit 20 may be spaced from the edge 18 of the transparent pane 12, such that a portion of the first surface 14 of the transparent pane 12 is exposed between the ceramic frit 20 and the edge 18 of the transparent pane 12.

As also shown in FIGS. 1-3, a primer 24 is coupled to at least one of the transparent pane 12 and the optional ceramic frit 20 for providing a bonding surface on the transparent pane 12. In certain embodiments, the primer 24 is an essentially chlorine-free adhesive composition for use in the adhesion of the subsequently applied first encapsulation layer 22A and the transparent pane 12.

In certain embodiments, the primer 24 comprises a modified polyolefin, and more preferably an essentially chlorine-free modified polyolefin, formed by graft-copolymerizing at least one member selected from the group consisting of an α,β-unsaturated carboxylic acid and an acid anhydride thereof, to a propylene-α-olefin copolymer such as described in U.S. Patent Publication No. 20070031644 to Kasahara et al., now abandoned, which is herein incorporated by reference in its entirety. The term "essentially chlorine-free", as defined herein, indicates that there is no chlorine purposely included or bonded into the polymeric material comprising the modified polyolefin. The primer 24 comprising the essentially chlorine-free modified polyolefin has a propylene-α-olefin copolymer as the main chain. Such a propylene-α-olefin copolymer is not particularly limited with respect to its structure or physical properties, so long as it is one formed by copolymerizing propylene with an α-olefin other than propylene.

The content of propylene units in the propylene-α-olefin copolymer of the essentially chlorine-free modified polyolefin is not particularly limited, but the content represented by the following formula is preferably at least 50 mol %, such as at least 60 mol %. The content, in terms of molar percent, is determined by dividing the molar amount of the propylene units by the molar amount of the total units, and multiplying the resultant number by 100 percent.

The α-olefin other than propylene to be used for the propylene-α-olefin copolymer of the essentially chlorine-free modified polyolefin is not particularly limited, and it may, for example, be ethylene, 1-butene, 1-heptene, 1-octene or 4-methyl-1-pentene. Among them, 1-butene is preferred, whereby the adhesive properties will be excellent. Such α-olefins may be incorporated alone or in combination as a mixture of two or more of them.

Further, the copolymer may contain, in addition to units of propylene and units of an α-olefin other than propylene, units of other monomers within a range not to impair the purpose of the present invention. In addition, the propylene-α-olefin copolymer may have substituents within a range not to impair the purpose of the present invention.

The physical properties, such as the weight-average molecular weight ($M_w$), melting temperature (Tm) and crystallinity, of the propylene-α-olefin copolymer are not particularly limited, but they are preferably those which satisfy the after-mentioned respective physical properties as a modified polyolefin. Such propylene-α-olefin copolymers may be used alone or in combination of two or more of them as the main chain of the modified polyolefin.

The side chain of the essentially chlorine-free modified polyolefin comprises at least one member selected from an α,β-unsaturated carboxylic acid and an acid anhydride thereof. Such a side chain may comprise the unsaturated carboxylic acid or may be formed by bonding of the unsaturated carboxylic acid to another organic group. The α,β-unsaturated carboxylic acid is not particularly limited, and it may, for example, be maleic acid, fumaric acid, itaconic acid or citraconic acid, and the acid anhydride of an α,β-unsaturated carboxylic acid may, for example, be maleic anhydride, itaconic anhydride or citraconic anhydride.

The amount of modification by the unsaturated carboxylic acid is preferably such that the mass of the unsaturated carboxylic acid, etc. to be introduced is from 0.1 to 10 parts by mass per 100 parts by mass of the modified polyolefin. If the amount of modification is at least 0.1 parts by mass, the chemical bond strength with the glass primer and/or the silane coupling agent will be good and an adequate adhesive strength will be obtained. If the amount of modification is at most 10 parts by mass, the polarity of the modified polyolefin will be good and the adhesive strength with a thermoplastic elastomer will be good. The amount of modification is more preferably from 1 to 5 parts by mass, such as at most 3 parts by mass.

The primer 24 has a weight-average molecular weight ($M_w$) of from 10,000 to 100,000 g/mol. When the weight-average molecular weight is at least 10,000 g/mol, the cohesive strength as the primer 24 will be good and an adequate adhesive strength can be obtained. Further, when the weight-average molecular weight is at most 100,000 g/mol, the solubility of the essentially chlorine-free modified polyolefin in the after-mentioned organic solvent will be high, whereby the solution will have a sufficient fluidity at room temperature to provide operation efficiency for coating with the solution. In certain embodiments, the weight-average molecular weight is from 30,000 to 70,000 g/mol, whereby the adhesive strength and the fluidity may be enhanced. In the present invention, the method for measuring the weight-average molecular weight is not particularly limited, but a measuring method by gel permeation chromatography (GPC) (calculated as standard polystyrene) is preferred. One exemplary primer 24 meeting the criteria described above and that may be used is AGT-3, available from AGC.

As also shown in FIGS. 1-3, an encapsulant 22 is bonded to the transparent pane 12. More specifically, the encapsulant 22 is bonded to the primer 24, which is bonded to the transparent pane 12. Generally, the encapsulant 22 couples the window assembly 10 to the vehicle. The encapsulant 22 has a seal for sealing between the window assembly 10 and the vehicle. The seal of the encapsulant 22 allows for a seamless transition from the edge 18 of the transparent pane 12 to sheet metal of the vehicle. Furthermore, locator clips/pins may be attached to the transparent pane 12 via overmolding of the encapsulant 22 for assisting with proper placement of the transparent pane 12 on the vehicle. The encapsulant 22 also protects the edge 18 of the transparent pane 12 from breaking. The coupling of the encapsulant 22 to the primer 24, which itself is bonded directly to the transparent pane 12 or bonded to the frit 20 which is bonded directly to the transparent pane 12, results in a bond strength between the encapsulant 22 and the transparent pane 12.

The encapsulant 22 may be a two-sided encapsulant and cover the entirety of the primer 24, as shown in FIG. 1, or cover only a portion of the primer 24 (i.e., wherein the primer 24 extends beyond the end portion of the encapsulant 22), as shown in FIG. 2. The encapsulant 22 can also be a three-sided encapsulant, as shown in FIG. 3. When the encapsulant 22 is bonded over the primer 24 to the edge 18 and either of the first surface 14 or the second surface 16 of the transparent pane 12, it is generally referred to in the art as a two-sided encapsulant. When the encapsulant 22 is bonded over the primer 24 to the first surface 14, the second surface 16 and the edge 18 of the transparent pane 12, it is generally referred to in the art as a three-sided encapsulant.

Figure 4:
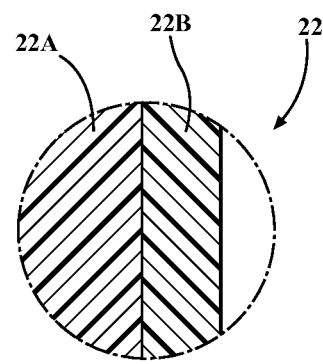
FIG. 4 is a cross-sectional view of a portion of the two-sided encapsulant of FIG. 1.

In certain embodiments, as shown best in FIG. 4, the encapsulant 22 includes a first encapsulation layer 22A and a second encapsulation layer 22B. Generally, the first encapsulation layer 22A is bonded to the bonding surface provided by the primer 24 for bonding the first encapsulation layer 22A to the transparent pane 12. Said differently, the first encapsulation layer 22A bonds to the primer 24, which is bonded to the transparent pane 12 and/or to the optional frit 20 which is bonded to the transparent pane 12, thereby bonding the first encapsulation layer 22A to the transparent pane 12. The primary bonding of the first encapsulation layer 22A to the transparent pane 12 via the primer 24 is also known as adhesive bonding, wherein the polymeric material of the first encapsulation layer 22A is entangled (i.e., physically interacting) with the polymeric material of the primer 24. In certain embodiments, the material comprising the first encapsulation layer 22A may also chemically react with the material comprising the primer 24 to form a chemical bond. In certain embodiments, the primer 24 increases the bond strength between the first encapsulation layer 22A and the transparent pane 12 as compared to the bond strength directly between the first encapsulation layer 22A and the transparent pane 12. Said differently, the first encapsulation layer 22A bonds better to the primer 24 than it would bond with the transparent pane 12 directly.

The second encapsulation layer 22B is bonded to the bonding second surface provided by the first encapsulation layer 22A. Stated differently, the second encapsulation layer 22B bonds to the first encapsulation layer 22A, which bonds to the primer 24.

Although the encapsulant 22 including the first encapsulation layer 22A and second encapsulation layer 22B is bonded to the primer 24, the primer 24 may still be visible when the window assembly 10 is viewed. For example, the primer 24 may extend beyond the encapsulant 22. Additionally, because the primer 24 is sandwiched between the transparent pane 12 and the encapsulant 22, the primer 24 may be visible when the window assembly 10 is viewed at an angle. Furthermore, the primer 24 and the ceramic frit 20 may be visible through the transparent pane 12 when the ceramic frit 20 and primer 24 are only disposed on the opposite side of the transparent pane 12.

The first encapsulation layer 22A, in certain embodiments, comprises a thermoplastic polymeric material having a Shore D hardness of at least 39, such as from 39 to 90. Shore hardness, including Shore A and Shore D hardness, as defined herein, measures the hardness of a material, and more specifically a material's ability to resist permanent indention, utilizing the procedures provided in ASTM D2240. In certain embodiments, the first encapsulation layer 22A has a Flexural modulus of at least 100 MPa, such as from 100 to 200 MPa. Flexural modulus, as defined herein, is the ratio of stress to strain in flexural deformation and is measured utilizing the procedures provided in ASTM D790 and ISO 527. In certain embodiments, the first encapsulation layer 22A comprises a thermoplastic polymeric material having a Shore D hardness of at least 39, such as from 39 to 90, and a Flexural modulus of at least 100 MPa, such as from 100 to 200 MPa.

In certain embodiments, the first encapsulation layer 22A comprises a thermoplastic polymeric material also having a tensile strength of from 50 to 120 MPa, such as 85 mPa, as measured by a universal tensile tester according to established test methods such as ISO 527. In certain embodiments, the first encapsulation layer 22A comprises a thermoplastic polymeric material also having % elongation of from 0.5% to 20%, such as 3.5%, as measured by a universal tensile tester according to established test methods such as ISO 527.

Suitable polymeric materials that may comprise the first encapsulation layer 22A and having the afore-mentioned Shore D hardness and Flexural modulus include polymeric materials based on polypropylene (PP), polyurethane (PU), or polyvinyl chloride (PVC). In certain embodiments, the first encapsulation layer 22A having the afore-mentioned Shore D hardness is a homopolymer of polypropylene having a weight average molecular weight ($M_w$) of at least 100,000 g/mol, such as at least one million g/mol, as measured by GPC.

In one exemplary embodiment, the first encapsulation layer 22A having the afore-mentioned Shore D hardness and bending modulus is formed from a homopolymer of polypropylene reinforced with glass fibers, such as polypropylene manufactured with 30% glass reinforcement sold under the trade name Karilen by MCT (Misch & Compendier Technik) of Germany.

In certain embodiments, the second encapsulation layer 22B comprises a polymeric material having a Shore A hardness is less than 90, such as from 55 to 80. Stated another way, the second encapsulation layer 22B, in certain embodiments, is a polymeric material having a hardness that is less than the hardness of the first encapsulation layer 22A as measured by the Shore hardness scales in accordance with ASTM D2240.

In certain embodiments, the second encapsulation layer 22B comprises a thermoplastic polymeric material also having a tensile strength of from 0.1 to 5 MPa, such as 2 mPa. In certain embodiments, the second encapsulation layer 22B comprises a thermoplastic polymeric material also having % elongation from 200% to 500%, such as 360%.

The second encapsulation layer 22B, in certain embodiments, comprises at least one polymeric material, and more typically at least one thermoplastic material. In certain embodiments, the thermoplastic material is a thermoplastic elastomer (TPE) (i.e., is a copolymer of a thermoplastic material and an elastomer) such as a thermoplastic vulcanizate (TPV), a thermoplastic polyolefin (TPO), a thermoplastic styrene (TPS) such as styrene-ethylene-butylene-styrene (SEBS), or combinations thereof. In certain embodiments, the second encapsulation layer 22B comprises a thermosetting material, such as reaction injection molding (RIM) materials, including polyurethane; and/or any other suitable material(s) for encapsulation.

Suitable TPEs that may be used in the second encapsulation layer 22B are amorphous or crystalline in nature, or may include both crystalline and amorphous segments (i.e., the TPE is a copolymer of an amorphous and crystalline thermoplastic elastomeric material).

In certain embodiments, the second encapsulation layer 22B is a TPE material such as thermoplastic polyesters, thermoplastic polyethers, and copolymers of thermoplastic polyesters and thermoplastic polyethers. In certain embodiments, the thermoplastic elastomer is a thermoplastic elastomer-ester (TPE-E).

Exemplary thermoplastic polyethers that may be used include aromatic polyethers or aliphatic polyethers such as polyoxyalkylene glycols, including, for example polyoxyethylene glycol and polyoxypropylene glycol. Exemplary thermoplastic polyesters that may be used generally include naturally-occurring or synthetically-produced thermoplastic polyesters and may be homopolymers or copolymers of aliphatic polyesters, semi-aromatic polyesters, and/or aromatic polyesters. One exemplary TPE that may be utilized, in conjunction with an olefin, as the second encapsulation material 22B is Santoprene™ 121-60m200, commercially available from ExxonMobil Chemical of Katy, Tex.

The transparent pane 12 is typically received at a production facility as a printed assembly, i.e., with the ceramic frit 20 already bonded thereto, as described above. As indicated above, it is to be appreciated that the transparent pane 12 may be either non-tempered or tempered glass, and may be non-laminated or laminated. During production, the primer 24 may be applied to the ceramic frit 20, the edge 18 and, if appropriate, to the portion of the transparent pane 12 exposed between the ceramic frit 20 and the edge 18 of the printed assembly. Depending on whether the window assembly 10 will include a two-sided or three-sided encapsulant, additional primer 24 may be added to the transparent pane 12. Typically, the primer 24 is applied using a felt applicator brush, either manually or in an automated process via a robotic arm. It is to be appreciated that the primer 24 may also be applied using any other suitable method of application. Typically, the primer 24 is applied to the first surface 14 of the transparent pane 12 and around the edge 18 of the transparent pane 12, such that it appears that the primer 24 wraps around the edge 18 of the transparent pane 12.

The transparent pane 12 including the primer 24 is allowed to flash at ambient temperature to remove solvent. Alternatively, the primer 24 may be heated to a temperature of at least 40° C. and no greater than 150° C., such as from 70° C. to 120° C., to remove solvent and prepare the primer 24 for application of a first encapsulation layer 22A.

The transparent pane 12 including the primer 24 is then introduced to a die cavity. A first polymeric material (i.e., the first shot of the two-shot encapsulant) is then injected into the die cavity in a molten state, such as at approximately 230° C. (450° F.), onto the transparent pane 12 including the primer 24 to form the encapsulation layer 22A. During the formation of the first encapsulation layer 22A, the first encapsulation layer 22A bonds to the transparent pane 12. More specifically, during the formation of the first encapsulation layer 22A, first encapsulation layer 22A bonds to the primer 24 that has been bonded either directly to the transparent pane 12 or to the ceramic frit 20, which is bonded to the transparent pane 12.

A second polymeric material (i.e., the second shot of the two-shot encapsulant) is then injected into the die cavity in a molten state, such as at approximately 260° C. (500° F.), for forming the second encapsulation layer 22B. During the formation of the second encapsulation layer 22B, the second encapsulation layer 22B bonds to the transparent pane 12. More specifically, during the formation of the second encapsulation layer 22B, the second encapsulation layer 22B bonds to the first encapsulation layer 22A, which is already bonded to the primer 24, that has been bonded either directly to the transparent pane 12 or to the ceramic frit 20, which is bonded to the transparent pane 12. The window assembly 10 including the transparent pane 12 coated with the primer 24 and encapsulant 22 is removed from the die cavity and is available for further processing and installation onto an automobile or other type of vehicle or device.

As is confirmed in the examples below, the window assemblies formed in accordance with the present invention including the modified polyolefin primer 24 and encapsulant 22, as described above, provides for substantially decreased water leakage as compared with window assemblies having a similar encapsulant but not utilizing a primer, or in window assemblies utilizing other types of primers, including chlorine-containing modified polyolefin primers, in addition to the encapsulant.

In addition to water leakage suppression, the window assemblies formed in accordance with the present invention including the essentially chlorine-free modified polyolefin primer 24 and encapsulant 22, as described above, further provides for substantially reduced leakage to water-based surfactant solutions that are designed in part to simulate the conditions found in a car wash.

EXAMPLES

Representative pairs of window assemblies including the two-shot encapsulant formed in accordance with the present invention and comparative window assemblies were prepared and evaluated for leakage using a water leakage test and a surfactant solution leakage test.

In the water leakage test, representative window assemblies are loaded into a water tight chamber. Approximately 30 mm of water are introduced onto the top surface of the transparent pane and left for 24 hours. After 24 hours, a visual determination was made as to whether there was leakage between the transparent pane and the coatings applied (primer and encapsulants) to the transparent pane and into a chamber beneath the sealed transparent pane.

In the surfactant solution leakage test, representative primed panes are loaded into the water tight chamber described in the previous paragraph. Approximately 30 mm of a surfactant solution (the surfactant solution includes approximately 97% water, 3% of Merpol SH, and 0.01% Fluoroscein) are introduced onto the top surface of the transparent pane and left for 24 hours. The surfactant solution is designed to be chemically similar to detergent solutions found utilized in a car wash. After 24 hours, a visual determination was made as to whether there was leakage between the transparent pane and the coatings applied to the transparent pane. In addition, a fluorescent scan was performed to determine whether there was slight leakage of the surfactant solution between the transparent pane and coating applied that may not be detectable by visual determination.

The preparation of window assemblies in accordance with the present invention, and comparative window assemblies, as well as water and surfactant solution leakage test results, is summarized in Tables 1 and 2 below:

TABLE 1

Evaluation of Window Assemblies for Water Leakage and Surfactant Solution Leakage

| Sample | Example 1 | Example 2 | Comparative Example 1 | Comparative Example 2 |
|---|---|---|---|---|
| Primer | AGT-3[1] | AGT-3[1] | None | YH-1650[2] |
| Ambient Flash to Remove Solvent | Yes | Yes | N/A | Yes |
| Heating Step following Ambient Flash | 80° C. for 2 minutes | No | No | 80° C. for 2 minutes |

TABLE 1-continued

Evaluation of Window Assemblies for Water Leakage and Surfactant Solution Leakage

| Sample | Example 1 | Example 2 | Comparative Example 1 | Comparative Example 2 |
|---|---|---|---|---|
| Description of Introduction of Primed Pane to Die Cavity for Encapsulation | Pane placed in die cavity at a temperature of at least 70° C. and no greater than 80° C. | Pane placed in die cavity at room temperature | Pane placed in die cavity at room temperature | Pane placed in die cavity at a temperature of at least 70° C. and no greater than 80° C. |
| Encapsulant 1 | PP[3] | PP[3] | PP[3] | PP[3] |
| Encapsulant 2 | TPE[4] | TPE[4] | TPE[4] | TPE[4] |
| Water Leakage after 24 hours | None | None | Severe leakage visually detected | Severe leakage visually detected |
| Surfactant Solution Leakage after 24 hours | None | Slight leakage detected by fluorescence, no visual leakage | Severe leakage visually detected | Severe leakage visually detected |

[1]Modified essentially chlorine-free polypropylene primer available from AGC.
[2]Chlorinated polypropylene primer commercially available from YH America of Salem, VA.
[3]30% glass reinforced, filled and stable homopolymer polypropylene product manufactured under the trade name Karilen by MCT Germany.
[4]Santoprene ™ 121-60m200 thermoplastic vulcanizate commercially available from ExxonMobil Chemical of Houston, Texas, and an olefin having a tensile strength 2 MPa and an elongation 360%.

As shown in Table 1, primed panes prepared in accordance with the present invention (Examples 1 and 2) exhibited no visible water leakage after 24 hours. Moreover, the inclusion of a heating step and introduction of the heated and primed pane to a die cavity at a temperature of at least 70° C. and no greater than 80° C. as in Example 1 resulted in improvements in the surfactant solution leakage test as compared with Example 2 (very slight leakage detected by fluorescence in Example 2 vs. no leakage in Example 1).

Table 1 also confirms that the inclusion of a primer in accordance with the present invention, in conjunction with the two-shot encapsulant (Examples 1 and 2), provided substantially improved water and surfactant solution leakage prevention as compared with a glass pane including the two-shot encapsulant but not including a primer (Comparative Example 1).

Table 1 also confirms that chlorinated, but otherwise substantially chemically similar version of the primers in accordance with the present invention (Comparative Example 2), exhibited severe water leakage after 24 hours as compared with essentially non-chlorinated versions of modified polyolefin primers formed in accordance with the present invention (Examples 1 and 2).

TABLE 2

Evaluation of Window Assemblies for Water Leakage and Surfactant Solution Leakage

| Sample | Example 1 | Comparative Example 3 | Comparative Example 4 |
|---|---|---|---|
| Primer | AGT-3[1] | MS-90[5] | Betaseal ™ 43518[6] and Betaseal ™ 43520A[7] |
| Ambient Flash to Remove Solvent | Yes | Yes | Yes |
| Heating Step following Ambient Flash | 80° C. for 2 minutes | No | No |
| Description of Introduction of Pane to Die Cavity for Encapsulation | Pane placed in die cavity at a temperature of at least 70° C. and no greater than 80° C. | Pane placed in die cavity at room temperature | Pane placed in die cavity at room temperature |
| Encapsulant 1 | PP[3] | PP[3] | PP[3] |
| Encapsulant 2 | TPE[4] | TPE[4] | TPE[4] |
| Water Leakage after 24 hours | None | Severe leakage visually detected | Severe leakage visually detected |
| Surfactant Solution Leakage after 24 hours | None | Severe leakage visually detected | Severe leakage visually detected |

[5]Formulated polyurethane glass primer commercially available from YH Automotive, Inc. of Salem, VA.
[6]Solvent-based, silane-blend glass primer available from Dow Automotive Systems of Auburn Hills, MI.
[7]Polyurethane-based, solvent-release type primer available from Dow Automotive Systems of Auburn Hills, MI.

Table 2 confirms that the inclusion of a modified polyolefin primer in accordance with the present invention, in conjunction with the two-shot encapsulant (Example 1), provided substantially improved water and surfactant solution leakage prevention as compared with a window assembly including the two-shot encapsulant but utilizing a different primer—here an isocyanate-based primer for glass panes with and without silane couplers (Comparative Examples 3 and 4, respectively).

The invention has been described in an illustrative manner, and it is to be understood that the terminology, which has been used, is intended to be in the nature of words of description rather than of limitation. It is now apparent to those skilled in the art that many modifications and variations of the present invention are possible in light of the above teachings. It is, therefore, to be understood that the invention can be practiced otherwise than as specifically described.

What is claimed is:

1. A window assembly comprising:
   a transparent pane having a first surface, a second surface, and an edge defined between said first surface and said second surface;
   a primer comprising a modified polyolefin disposed on at least one of said first surface and said second surface of said transparent pane;
   a first encapsulation layer disposed on and bonded to said primer such that said primer is located between said transparent pane and said first encapsulation layer, said first encapsulation layer having a Shore D hardness of at least 39 and a Flexural modulus of from 100 MPa to 200 MPa; and
   a second encapsulation layer disposed on and bonded to said first encapsulation layer such that said first encapsulation layer is located between said primer and said second encapsulation layer, said second encapsulation layer having a Shore A hardness of less than 90.

2. The window assembly of claim 1, wherein said primer comprising said modified polyolefin is formed by graft-copolymerizing at least one member selected from the group consisting of an α,β-unsaturated carboxylic acid and an acid anhydride thereof, to a propylene-α-olefin copolymer.

3. The window assembly according to claim 1 wherein said first encapsulation layer comprises a polymeric material selected from the group comprising polypropylene, polyurethane, polyvinyl chloride, and combinations thereof.

4. The window assembly according to claim 1, wherein said first encapsulation layer comprises a homopolymer of polypropylene having a weight average molecular weight ($M_w$) of at least 100,000 g/mol.

5. The window assembly according to claim 4, wherein said homopolymer of polypropylene is reinforced with glass fibers.

6. The window assembly according to claim 1, wherein the Shore A hardness of said second encapsulation layer ranges from 55 to 80.

7. The window assembly according claim 1, wherein said second encapsulation layer comprises a thermoplastic material.

8. The window assembly according to claim 7, wherein said thermoplastic material comprises a thermoplastic elastomer.

9. The window assembly according to claim 8, wherein said thermoplastic elastomer comprises copolymers of at least one thermoplastic polyester, copolymers of at least one thermoplastic polyether, or copolymers of at least one thermoplastic polyester and at least one thermoplastic polyether.

10. The window assembly according to claim 8, wherein said thermoplastic elastomer comprises a thermoplastic elastomer-ester.

11. The window assembly according to claim 8, wherein said thermoplastic elastomer comprises a copolymer of at least one amorphous thermoplastic elastomeric material and at least one crystalline thermoplastic elastomeric material.

12. The window assembly according to claim 7, wherein said thermoplastic material is selected from the group comprising a thermoplastic elastomer, a thermoplastic vulcanizate, a thermoplastic polyolefin, a thermoplastic styrene, and combinations thereof.

13. The window assembly to claim 1, further comprising a ceramic frit disposed on said transparent pane between said transparent pane and said primer.

14. The window assembly according to claim 1, wherein said primer is disposed on each of said first surface and said second surface of said transparent pane.

15. The window assembly according to claim 1, wherein said primer is also disposed on said edge of said transparent pane.

16. The window assembly according to claim 1, wherein said first encapsulation layer is bonded to said transparent pane.

17. A method of manufacturing a window assembly comprising:
applying a primer to at least one of a first surface and a second surface of a transparent pane, said primer comprising a modified polyolefin;
heating said primer applied to said transparent pane to a temperature of at least 40° C. and no greater than 150° C. to form a heated primer;
applying a first encapsulation layer on said heated primer such that said primer is located between said transparent pane and said first encapsulation layer and such that said first encapsulation layer is bonded to said primer, said first encapsulation layer having a Shore D hardness of at least 39 and a Flexural modulus of from 100 MPa to 200 MPa; and
applying a second encapsulation layer on said first encapsulation layer such that said first encapsulation layer is located between said primer and said second encapsulation layer and such that said second encapsulation layer is bonded to said first encapsulation layer, said second encapsulation layer comprising a thermoplastic material having a Shore A hardness less than 90.

18. The method of claim 17, wherein said primer comprises an essentially chlorine-free modified polyolefin.

19. The method of claim 17, wherein the step of heating said primer comprises heating said primer applied to said transparent pane to a temperature of at least 70° C. and no greater than 120° C.

20. The method of claim 17, wherein said primer is applied to said first surface and to said second surface of said transparent pane and to an edge portion of said transparent pane between said first surface and said second surface.

21. A window assembly formed in accordance with the method of claim 17.

22. The method according to claim 17, wherein said first encapsulation layer comprises a homopolymer of polypropylene reinforced with glass fibers.

* * * * *